Sept. 3, 1940. S. B. WINN 2,213,424
FIFTH WHEEL
Filed Feb. 7, 1938 2 Sheets-Sheet 2

Inventor
Sidney B. Winn

By
Attorneys

Patented Sept. 3, 1940

2,213,424

UNITED STATES PATENT OFFICE 2,213,424

FIFTH WHEEL

Sidney B. Winn, Lapeer, Mich.

Application February 7, 1938, Serial No. 189,117

2 Claims. (Cl. 280—33.1)

This invention relates to coupling means for tractors and semi-trailers. Coupling means as commonly used for this purpose embody a fifth wheel through which the weight of the forward end of the trailer is transmitted to the tractor and a king pin which constitutes the draft member between the tractor and trailer as well as a vertical pivot about which the trailer may swing relative to the tractors.

Coupling means of the character above referred to have been standardized into two types. One type is characterized by having the king pin mounted upon the tractor, in which case the coupling jaws that encircle the king pin are carried by the trailer. The other type is characterized by having the king pin mounted upon the trailer, in which case the fifth wheel on the tractor is slotted to receive the king pin and has coupling jaws adapted to encircle the king pin to establish a coupled relationship. Trailers equipped with one of the above mentioned types of coupling means cannot ordinarily be used with tractors having the other type.

The primary object of this invention is to provide a fifth wheel assembly which is adapted for coupling to trailers having either type of coupling mechanism. That is, the present fifth wheel assembly may be coupled to semi-trailers of the type embodying coupling members for engagement with a king pin carried by the tractor, and also may be coupled to trailers of the type wherein the king pin is mounted on the trailer. To this end, the fifth wheel is constructed with a slot and coupling jaws adapted to receive and engage, respectively, a king pin mounted on the trailer. The fifth wheel also has a king pin mounted whereby it is housed beneath the top surface thereof when it is used in conjunction with a semi-trailer having a king pin mounted thereon. When the tractor is used in conjunction with a semi-trailer having no king pin thereon, or in other words the other type, the king pin is moved to a position where it projects above the fifth wheel for cooperating with coupling jaws on the trailer.

Another object of the invention is to provide a fifth wheel with a movable king pin and means for moving it to a position where it projects above the top surface of the fifth wheel, or to a position where it is entirely housed beneath the top surface of the king pin.

Another object is to provide means of the character referred to immediately above embodying releasable means for holding the king pin in its projected position.

With the above and other ends in view, the invention is more fully disclosed with reference to the accompanying drawings, in which Figure 1 is a plan view of the fifth wheel;

Figure 1:
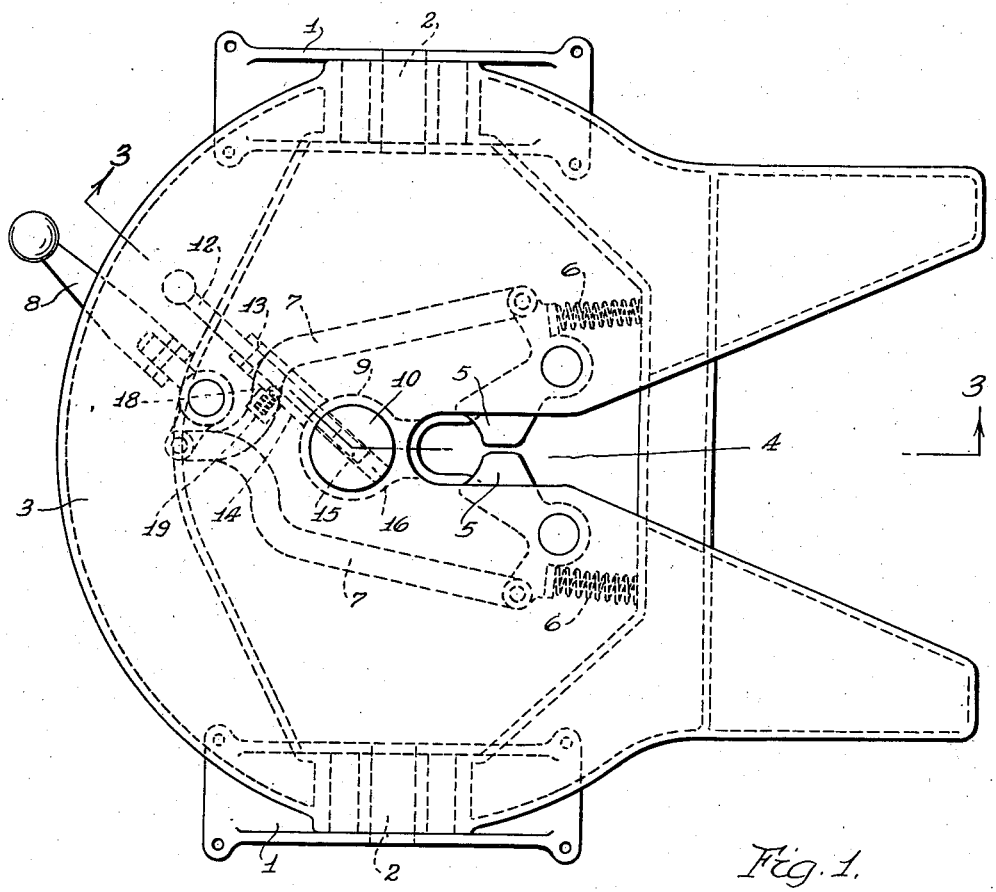
Figure 2:
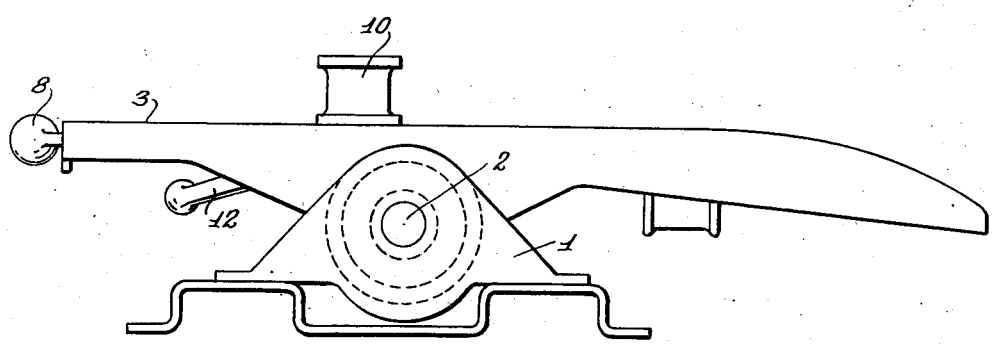
Fig. 2 is a side elevation of the fifth wheel.

The brackets 1 are adapted to be mounted upon a tractor of the type commonly used in conjunction with semi-trailers. The brackets 1 carry horizontal pivots 2 upon which the fifth wheel 3 is rockably supported. The fifth wheel 3 has a slot 4 for the reception of a king pin, and coupling jaws 5 normally held by springs 6 in a position whereby they retain a king pin in the slot. In other words, the slot 4 and coupling jaws 5 constitute means for coupling a semi-trailer of the type wherein the king pin is mounted upon the trailer.

The coupling jaws 5 are so formed and pivoted that a king pin entering the slot brushes them aside, during the coupling function. To permit uncoupling, the jaws may be moved by links 7 which are adapted to be actuated by the hand lever 8.

Extending beneath the top surface of the fifth wheel is a well 9 in which a king pin 10 is slidably mounted. The wall of the well 9 is slotted at 11 and a lever 12, pivoted at 13 on a bracket 14 carried by the wall formation, has its end 15 extended through the slot 11 and engaging the bottom of a groove 16 in the bottom of the king pin. The lever 12 has a depression 17 therein adapted to be engaged by a ball 18. The ball 18 is mounted in a fitting 19 secured to the bracket 14 and is pressed by a spring 20 into engagement with the lever 12.

Figure 3:
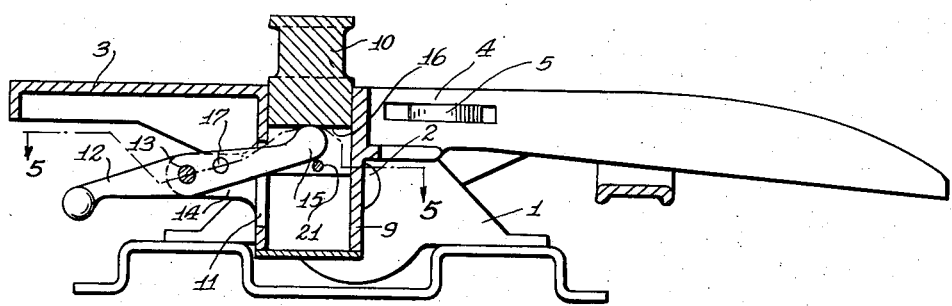
Fig. 3 is a section taken substantially on the line 3—3 of Fig. 1.

When the fifth wheel is to be used in conjunction with a semi-trailer having the coupling jaws thereon, the lever 12 is manually moved to the position shown in Fig. 3 and causes the king pin to be elevated to a position where it projects above the top surface of the fifth wheel. When the lever 12 is thus moved the ball 18 engages the depression 17 and holds the lever 12 in a position maintaining the king pin elevated.

Figure 4:
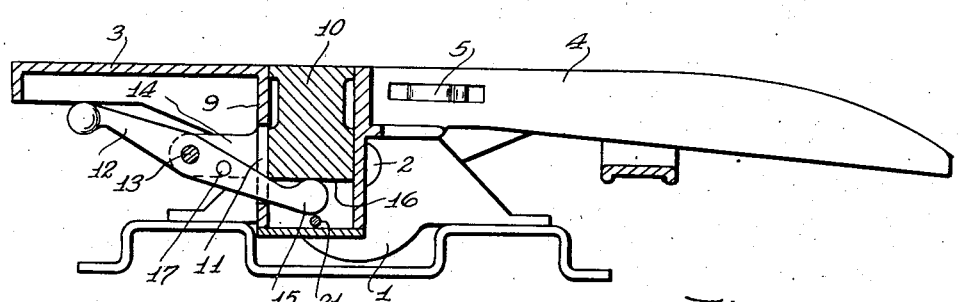
Fig. 4 is a section, similar to Fig. 3, illustrating the king pin in another position.
Figure 5:
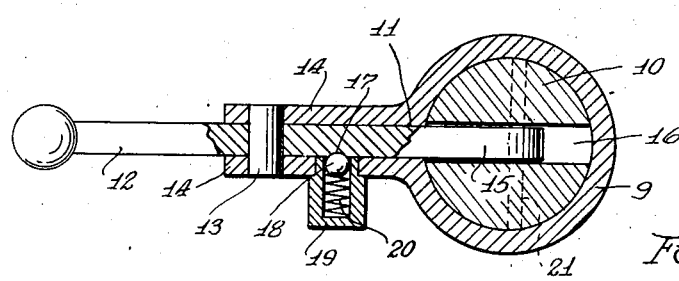
Fig. 5 is a fragmental section taken on the line 5—5 of Fig. 3.

When the king pin is to be used in conjunction with a semi-trailer having a king pin thereon, the lever 12 is manually moved to drop the king pin to the position shown in Fig. 4. The king pin ordinarily will fall by force of gravity when it is unsupported by the lever 12, but in order to positively insure downward movement a pin 21 is provided in the king pin 10 extending across the groove 16 (Figures 3 to 5) and is engaged by the lever end 15 when the lever 12 is rocked to release it from the above described retaining means.

Although a specific embodiment of the invention has been illustrated and described it will be understood that various changes may be made within the scope of the appended claims without departing from the spirit of the invention and such changes are contemplated.

What I claim is:

1. A fifth wheel for tractor-trailer vehicles comprising, a supporting member mounted on one of the vehicles for pivotal movement solely about an axis transversely of the vehicle, said member having an upper bearing surface and having a rearwardly facing slot at one side of said axis transversely thereto for receiving a king pin carried by the other vehicle, said supporting member having a recess on the other side of said axis from said slot to receive a king pin for cooperation with coupling means on the other vehicle, said second-named king pin being movable in said recess from a position entirely below said surface to a raised position projecting above said surface, means operable to move said second-named king pin, and releasable means comprising a resiliently pressed detent for automatically holding said second-named king pin in its raised position.

2. In a fifth wheel member adapted for connecting with either a male or a female complementary fifth wheel, a king pin member reciprocably mounted in a recess extending below the upper periphery of said fifth wheel member, operating means projecting into said recess adapted to apply an elevating force to said king pin member, and means comprising a resiliently pressed detent for releasably holding said king pin member in its elevated position.

SIDNEY B. WINN.